UNITED STATES PATENT OFFICE.

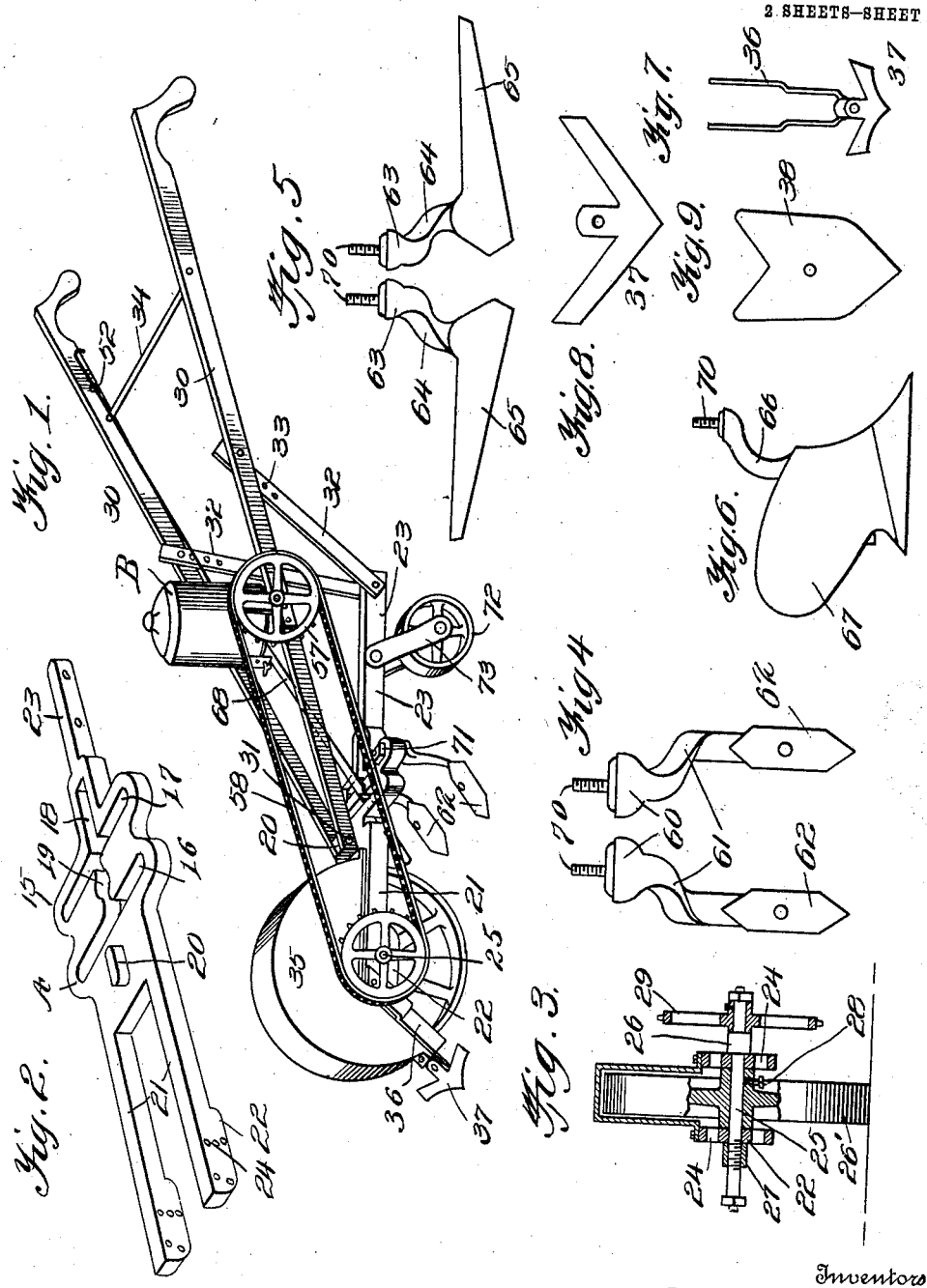

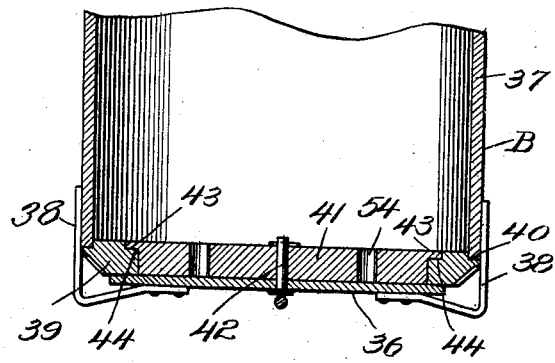
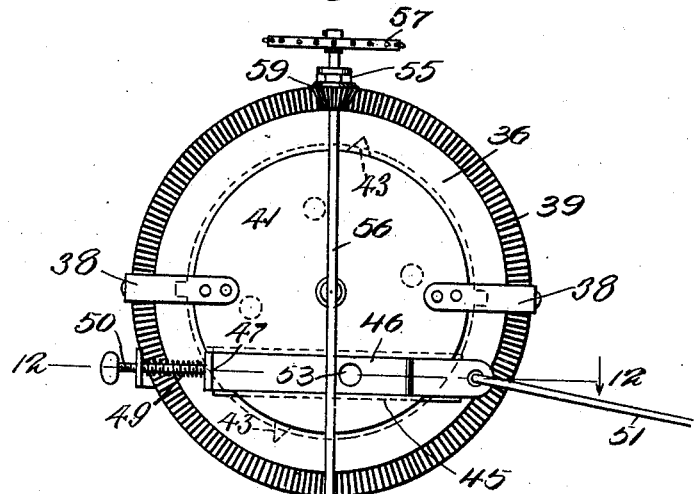
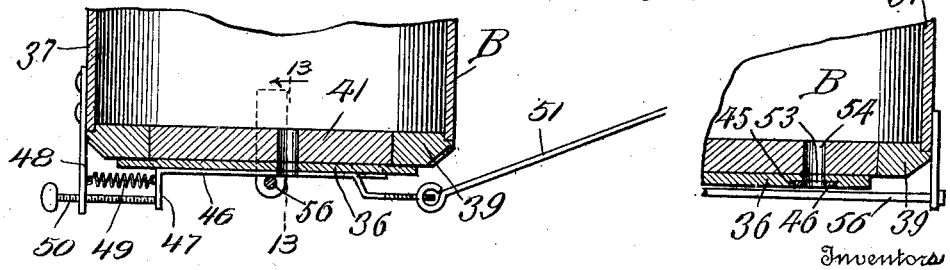

JAMES F. MIXON AND OTICE H. FORD, OF MANATEE, FLORIDA.

GARDEN-PLOW AND SEED-PLANTER.

976,675. Specification of Letters Patent. Patented Nov. 22, 1910.

Application filed December 21, 1909. Serial No. 534,343.

*To all whom it may concern:*

Be it known that we, JAMES F. MIXON and OTICE H. FORD, citizens of the United States, residing at Manatee, in the county of Manatee, and State of Florida, have invented new and useful Improvements in Garden-Plows and Seed-Planters, of which the following is a specification.

This invention relates to an improved garden plow and seed planter combined; and it has for its object to provide a device of this class of simple and durable construction which may be efficiently utilized for planting and cultivating garden seeds.

A further object of the invention is to provide a supporting frame for an implement of this class which shall be of simple and improved construction.

Still further objects of the invention are to simplify and improve the construction and operation of this class of devices.

With these and other ends in view which will readily appear as the nature of the invention is better understood the same consists in the improved construction and novel arrangement and combination of parts which will be hereinafter fully described and particularly pointed out in the claims.

In the accompanying drawings has been illustrated a simple and preferred form of the invention; it being however understood that no limitation is necessarily made to the precise structural details therein exhibited, but that changes, alterations and modifications within the scope of the invention may be resorted to when desired.

In the drawings: Figure 1 is a perspective view of a garden plow and seed planter constructed in accordance with the invention. Fig. 2 is a perspective detail view of the frame of the machine. Fig. 3 is a vertical transverse sectional view laid through the axle of the transporting and operating wheel. Figs. 4, 5 and 6 are detail views illustrating various forms of covering plows that may be used in connection with the device. Fig. 7 is a detail view of a sweep that may be used as a furrow opener, showing also the arms for connecting the same with the frame. Fig. 8 is a detail view showing the sweep detached. Fig. 9 is a detail view of a furrow tongue which may be substituted for the sweep. Fig. 10 is a transverse sectional view of the seed box. Fig. 11 is a bottom plan view of the same. Fig. 12 is a longitudinal vertical sectional view taken on the plane indicated by the line 12—12 in Fig. 11. Fig. 13 is a sectional detail view taken on the plane indicated by the line 13—13 in Fig. 12.

Corresponding parts in the several figures are denoted by like characters of reference.

The frame A of the improved machine comprises a body portion 15 having transversely disposed parallel slots 16 and 17 the rear one of which 17 has a rearwardly extending recess 18; a centrally disposed channel 19 connects the front and rear slots 16 and 17. The body portion is provided with an upwardly extending lug 20 and with forwardly extending arms 21 provided at their front ends with reinforced or thickened portions forming downwardly extending flanges 22; an arm or beam 23 extends rearwardly from the body portion of the frame.

The flanges 22 are provided each with a plurality of transverse perforations 24 for the reception of a transversely disposed shaft or axle 25 upon which the transporting wheel 26' is supported for rotation between the arms 21 of the frame; the shaft or axle 25 may be formed with a shoulder 26 abutting upon one of the frame bars and a nut or threaded collar 27 may be detachably mounted upon the axle to abut upon the other frame bar, thus securing the axle in position. The transporting wheel 26' is connected for rotation with the axle by means of a set screw 28, the axle being fitted to rotate in the bearings formed by the apertures 24. When the machine is to be utilized as a seed planter, a sprocket wheel 29 is mounted upon the axle adjacent to one end of the latter, but when the machine is to be used only for the purpose of plowing or cultivating the soil, the sprocket wheel 29 may be omitted.

Handles 30 resembling ordinary plow handles are connected with the lug or projection 20 of the frame by means of a transversely disposed fastening member such as a pin or bolt 31; braces 32 connect the handles with the beam 23 extending rearwardly from the frame, thus supporting the handles at the desired elevation; the braces may be provided with series of apertures 33 for the passage of the fastening members whereby they are connected with the handles, thus providing for the vertical adjustment of the latter. A round 34 serves to connect the handles together in the customary manner.

A hood or casing 35 completely covering the upper and forward portion of the wheel 26' is suitably mounted upon the forward part of the frame; the latter is also provided with downwardly and forwardly extending arms or standards 36 serving to support a furrow opener which may consist of a sweep 37 substantially as shown in Figs. 1, 7 and 8; a bull tongue 38 as shown in Fig. 9 may be substituted for the sweep when desired.

A seed box or hopper B is suitably supported upon the handles 30, said seed box being provided with a bottom plate 36 that is connected with and spaced from the side walls 37 by means of brackets 38; a beveled gear 39 is supported for rotation upon the bottom plate 36 in the space between said bottom plate and the side walls of the hopper, said bevel gear being provided with a shoulder or offset 40 engaging the lower edge of the cylindrical box which constitutes the hopper so as to be thereby guided for rotation. A seed plate or disk 41 is supported upon the bottom plate 36 with which it is axially connected by means of a pin 42; said seed disk being provided with projections 43 engaging corresponding recesses 44 in the bevel gear with which said seed disk is thus connected for rotation.

The underside of the bottom plate 36 is provided with a groove 45 which has been shown as being formed at one side of the axis of the disk although it is desired to be understood that said groove may be formed diametrically across the disk or in any other suitable and desired position; said groove, which is preferably dove-tailed accommodates a longitudinally movable slide 46 one end of which has a downturned lug 47 which is connected with a bracket 48 depending from the seed box by means of a traction spring 49; a set screw 50 extending through the bracket 48 serves to limit the movement in a forward direction of the slide 46, the point of said set screw being disposed in the path of the lug 47. The opposite or rear end of the slide 46 is suitably connected with a rod 51 which is guided through a staple or keeper 52 upon one of the handles 30, the rear end of said rod being within convenient reach of the operator, who, by means of said rod may actuate the slide 46 against the traction of the spring 49. The slide 46 has a seed opening or aperture 53, and the seed disk 36 is provided with a plurality of seed cups or apertures 54 of any suitable dimensions, and adapted to register with the aperture 53 in the slide. It will be readily seen that by manipulating the set screw 50, the slide may be adjusted so as to partially obstruct the seed cups, thus serving to regulate the amount of seed that shall be permitted to pass through the latter at each operation; by manipulating the operating rod 51, the slide may be moved to an obstructing position with reference to the seed cups or apertures 54, thus completely cutting off the passage of seed when desired. Bearings 55 depending at opposite sides of the seed box serve to support a transversely disposed shaft 56 having at one end a sprocket wheel 57 that receives motion by a link belt or chain 58 from the sprocket wheel 29 upon the axle 25; the shaft 56 also carries a pinion 59 meshing with the bevel gear 39 which is thereby rotated.

Seed covering devices of various forms have been shown in Figs. 4, 5 and 6 of the drawings. In Fig. 4 has been shown standards 60 formed with offsets 61 and carrying reversible bull tongues 62; in Fig. 5 shanks 63 have been shown having offsets 64 and equipped with sweeps 65; in Fig. 6 has been shown a shank or standard 66 carrying an ordinary turning plow 67, it being intended to use two such plows, namely, one right hand and one left hand, for the purpose of effectively covering the seed. The seed passing from the seed box or hopper enters a seed tube or spout 68 which may be connected in any convenient manner with the bottom plate 36 of the hopper and which extends through the central opening 19 of the frame, thus discharging the seed into the furrow formed by the furrow opener a suitable distance in advance of the coverers, the shanks of which are provided with upwardly extending screw-threaded stems 70 whereby they may be mounted in either of the slots 16 or 17 of the frame, being there secured by means of nuts 71.

A trailing wheel 72 is supported for rotation by means of arms or brackets 73 whereby it is connected with the rearwardly extending beam portion 23 of the frame, said wheel being disposed a suitable distance in rear of the coverers for the purpose of compressing and compacting the soil.

From the foregoing description taken in connection with the drawings hereto annexed the operation and advantages of this invention will be readily understood by those skilled in the art to which it appertains.

The device is simple and light in construction and may be readily operated by hand. By means of this machine a furrow of any desired dimensions may be opened, seed deposited therein, and the seed may be covered and the soil compact or rolled at a single operation. The depth of the furrow may be regulated by raising or lowering the axle of the supporting or transporting wheel, a plurality of axle supporting bearings being provided for this purpose.

The device is easily operated as a planter and when desired, the clamping mechanism may be disconnected and the machine may be used for cultivating the crops.

In cultivating garden trucks it is often desirable to cultivate the soil between rows of growing plants; when this is the case, such adjacent rows of plants will be protected from injury by the hood or casing surrounding the upper portion of the transporting wheel.

When it is desired to use a single plow only, of the pattern shown in Fig. 6, the stem 70 of such plow may be accommodated in the recess 18 of the frame.

Having thus described the invention, what is claimed is—

1. In a machine of the class described, a frame having handles and an axle provided with carrying wheels, a cylindrical seed box supported upon the handles and having a bottom member spaced from the walls thereof and provided with a slide having an aperture, a bevel gear supported for rotation in the space intermediate the bottom and the walls of the said box, and resting upon the bottom plate, a seed disk connected for rotation with the bevel gears and having a plurality of apertures adapted to register with the aperture in the slide, a transversely disposed shaft supported for rotation adjacent to the bottom of the said box, a pinion upon said shaft meshing with the bevel gear, a sprocket wheel upon the wheel carrying axle, and a link belt connecting the said sprocket wheels.

2. In a machine of the class described, a frame, having a wheel carrying axle and provided with transverse slots connected by an aperture or opening; a furrow opener connected with the frame, coverers adjustable in the transverse slots of the frame, handles connected with the frame, seed dropping mechanism supported upon the handles and including a box or hopper, and a seed chute or spout leading from the bottom of the seed box through the aperture of the frame, and discharging at a point intermediate the furrow opener and the coverers.

3. In a machine of the class described, a cylindrical seed box having a bottom member connected with and spaced from the side walls thereof, said bottom member being provided with an apertured regulating slide, a beveled gear supported for rotation in the space intermediate the bottom plate, and the side walls of the box and having a seed disk provided with a plurality of apertures, means for rotating the bevel gear, an actuating spring for the regulating slide, and adjustable stop means such as a set screw located in the path of said slide.

4. In a machine of the character described, a seed box having a bottom member spaced from the side walls thereof, a gear wheel supported for rotation in the space intermediate the bottom plate and the side walls, a seed disk connected for rotation with the gear wheel and having a plurality of apertures, an apertured seed slide connected with the bottom plate and having a down-turned lug at one end, a spring connecting said lug with a bracket depending from the seed box, a set screw threaded through said bracket and extending in the path of the lug upon the slide, and a suitable guided operating rod connected with the opposite end of the slide.

In testimony whereof we affix our signatures in presence of two witnesses.

JAMES F. MIXON.
OTICE H. FORD.

Witnesses:
   Geo. Tatum, Jr.,
   J. J. Stewart.